July 26, 1955 C. E. MENDEZ 2,714,017
ANTI-JACKKNIFE DEVICE FOR HALF-TANDEM OF SEMI-TRAILER
Filed Sept. 6, 1951
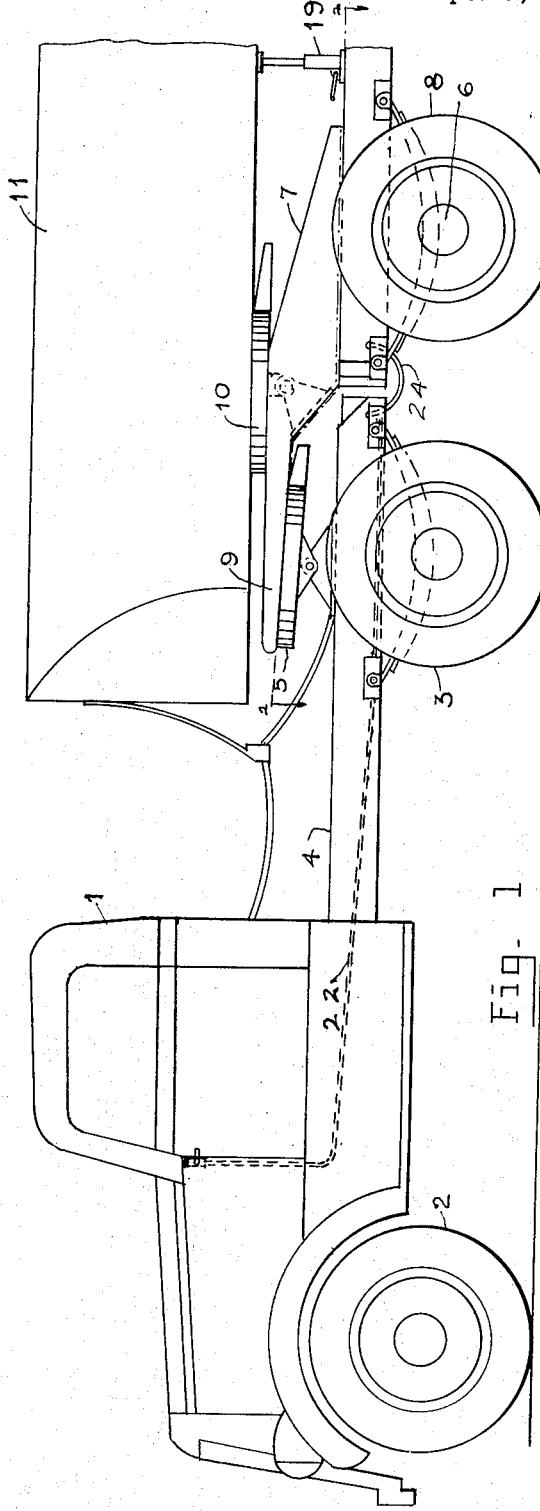
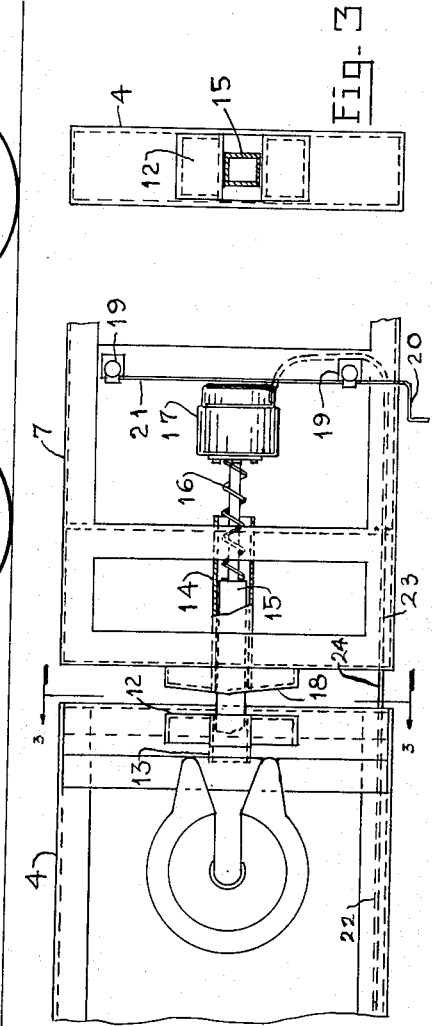
Charles E. Mendez
INVENTOR.
BY *Arthur A. Minnick*
ATTORNEY

United States Patent Office 2,714,017
Patented July 26, 1955

2,714,017

ANTI-JACKKNIFE DEVICE FOR HALF-TANDEM OF SEMI-TRAILER

Charles E. Mendez, Tampa, Fla.

Application September 6, 1951, Serial No. 245,303

1 Claim. (Cl. 280—432)

This invention relates to tractors and semi-trailers and particularly to the type in which a fifth wheel on the tractor supports the front end of a wheeled frame upon which is mounted a second fifth wheel supporting the front end of a semi-trailer. While the tractor is moving forward, the rear end of the semi-trailer follows in alinement, but if the driver of the tractor attempts to back, pivotal movement of either or both of the fifth wheels renders accurate backing of the semi-trailer very difficult.

One of the principal objects of the invention is to provide simple, efficient, and easily operated means for preventing the pivotal movement of the forward fifth wheel while leaving the other in operation.

Another object of the invention is to provide a weight-distributing, auxiliary supporting member having means for engaging a semi-trailer to maintain the member in position for re-coupling with a tractor when the tractor is uncoupled from the member.

Other objects of the invention will appear in connection with the description of a preferred form of construction chosen for purposes of illustration in the accompanying drawing, in which Figure 1 is a side elevation of the tractor, the semi-trailer, and the intermediate weight-distributing wheeled member, hereinafter termed the half-tandem, the rear portion of the semi-trailer being broken away; Fig. 2 is a fragmentary plan view looking downward from the line 2—2 of Fig. 1 with the locking mechanism in operative position; and Fig. 3 is a rear end view of the tractor chassis as seen from the line 3—3.

The tractor 1 has front wheels 2 rear wheels 3 and a chassis 4, on which is mounted a fifth wheel of any preferred construction. A trailing axle 6 is mounted in a half-tandem frame 7 on wheels 8, the frame having a forward extension or bill 9. When the tractor is backed to bring the fifth wheel 5 under the bill, cam faces on the fifth wheel engage a king pin (not shown) on the under side of the bill to cause automatic coupling of the tractor to the half-tandem in a manner well known in the art.

Carried on the top of the frame of the half-tandem 7 is a fifth wheel 10 engaged by a king pin (not shown) on the underside of the semi-trailer 11.

With this construction, it will be apparent that the load of the front end of the semi-trailer will be distributed among the wheels 3 and 8 (which will usually be mounted four to an axle), and the angular movement of the wheels 8 permitted by the pivotal connection of the bill 9 of the half-tandem with the fifth wheel 5, will allow the wheels 8 to follow the same curves as those made by the wheels 3 when the tractor is turned in travelling, thus avoiding the excessive wear on the tires that occurs in the ordinary four-wheeled tandem having two parallel axles without relative angular movement.

The rear face of the chassis 4 of the tractor has a bumper plate 12 at the center of which is a channel member 13. Secured within the framework of the half-tandem 7 in alinement with the channel member 13 is a channel member 14 within which is slidably mounted a bolt 15 which is normally held retracted within the channel 14 by a spring 16, but which may be projected forward into the channel 13 by a pneumatic cylinder 17 controlled by a valve preferably located in the driver's cab of the tractor.

The bolt 15 has a close sliding fit with the side walls of the channel members 13 and 14 but can slide vertically between these side walls to give freedom for vertical movement of the wheels of the half-tandem upon the horizontal pivot of the fifth wheel 5.

If the two channels 13 and 14 are not in alinement when the controlling valve is opened, the front end of the bolt will engage the bumper plate 12 and will be held in contact therewith by pneumatic pressure until movement of the tractor swings the half-tandem into line, whereupon the bolt will automatically slide forward into the channel 13. With the bolt in this locked position, the front fifth wheel 5 is rendered inoperative and the wheels 8 will be alined with the wheels 3 for backing, the rear fifth wheel remaining free for pivotal movement of the semi-trailer.

A bumper 18 on the front end of the frame of the half-tandem has sloping front faces on each side of the center which engage with the rear faces of the chassis of the tractor when a certain degree of angular movement toward either side occurs, thus allowing all necessary freedom of movement of the half-tandem but preventing excessive swinging which might lead to "jackknifing."

On top of the frame of the half-tandem, on each side and to the rear of the wheels 8, are screw jacks 19 operated by a crank 20 on the shaft 21. When it is desired to disconnect the tractor from the half-tandem, the tops of the jacks are brought into contact with the bottom of the body 11 of the semi-trailer to press down on the rear end of the frame 7, thus taking the weight off the bill 9 and the fifth wheel 5. When the tractor is then released from the king pin on the bill and moves forward, the frame of the half-tandem remains at the proper height to receive the same or another tractor. The half-tandem thus forms a landing gear that obviates the necessity for using a conventional dolly.

The air tube 22 shown in broken lines along the tractor is connected with the air tube 23 on the half-tandem by a detachable flexible member 24.

I claim:

In combination with a tractor including a chassis having front and rear wheels, a fifth wheel on the chassis adjacent the rear end thereof, a half-tandem frame having a forward extension pivotally connected to said fifth wheel and provided with a trailing axle supported by wheels, the rear end of said chassis being provided with a bumper plate at the center of which is disposed a channel member having opposed vertical side walls, a channel member supported by the half-tandem frame and having vertical side walls longitudinally aligned with the side walls of said first channel member when the rear tractor wheels and the said wheels supporting the half-tandem frame are longitudinally aligned, a bolt supported in said last channel member for longitudinal sliding movement thereon and for vertical angular movement along the side walls, a coil spring engaged with said bolt for normally retracting same into said last channel member, and a pneumatic cylinder supported by said half-tandem frame and operatively engaged with said bolt for moving same into said first channel member when said tractor and half-tandem frame wheels are aligned for retaining such alignment to facilitate backing of the tractor and attached half-tandem frame.

References Cited in the file of this patent

UNITED STATES PATENTS

| | | |
|---|---|---|
| 1,550,555 | Mayer | Aug. 18, 1925 |
| 2,151,640 | Menning | Mar. 21, 1939 |
| 2,330,897 | Kirksey | Oct. 5, 1943 |